United States Patent

Snyder

[11] Patent Number: 4,716,697
[45] Date of Patent: Jan. 5, 1988

[54] MOVABLE DOOR SEAL

[76] Inventor: Robert G. Snyder, 10204 Roadsted Way West, Raleigh, N.C. 27612

[21] Appl. No.: 895,903

[22] Filed: Aug. 11, 1986

[51] Int. Cl.⁴ .......................... E06B 1/00; E06B 7/16; E06B 5/00
[52] U.S. Cl. ................................. 52/173 DS; 16/366; 49/246
[58] Field of Search ................ 49/253, 381, 399, 246; 16/282, 287, 366; 52/173 DS

[56] References Cited

U.S. PATENT DOCUMENTS

| | | | |
|---|---|---|---|
| 1,117,903 | 11/1914 | Powers | 49/246 X |
| 2,072,641 | 3/1937 | Madland | 49/246 X |
| 2,901,783 | 9/1959 | Soddy | 49/246 |
| 3,016,261 | 1/1962 | Tatter | 49/246 |
| 3,181,205 | 5/1965 | Frommelt et al. | 20/69 |
| 3,375,625 | 4/1968 | Edkins et al. | 52/173 |
| 3,934,380 | 1/1976 | Frommelt et al. | 52/173 DS |
| 4,003,170 | 1/1977 | Mellyn | 52/173 DS |
| 4,104,836 | 8/1978 | Weibull | 52/173 DS |
| 4,286,411 | 9/1981 | Wikkerink et al. | 49/253 X |

FOREIGN PATENT DOCUMENTS

| | | | |
|---|---|---|---|
| 958946 | 12/1974 | Canada | 52/173 DS |
| 2930295 | 2/1981 | Fed. Rep. of Germany | |
| 10096 | 8/1898 | Sweden | 49/253 |

*Primary Examiner*—Alfred C. Perham
*Attorney, Agent, or Firm*—Kilpatrick & Cody

[57] ABSTRACT

A truck loading dock door seal which moves between a "summer" position which permits ventilation to enter a truck and a "winter" position which establishes sealing engagement between the building and a truck position at a loading dock. Such movement may be provided by a double-acting hinge.

6 Claims, 5 Drawing Figures

MOVABLE DOOR SEAL

BACKGROUND OF THE INVENTION

This invention relates to door seals of the type utilized adjacent to the opening of a building at a loading dock. Such structures provide a seal against the rear of a truck positioned at the loading dock in order to move goods from the truck into the building or from the building into the truck.

It is desirable, in certain instances, to provide a seal between the rear of a truck positioned at a building's loading dock and the building to prevent entry of warmer, outside air into refrigerated chambers within the truck and within the building while the truck is being loaded or unloaded or, under other circumstances, to prevent cold, outside air from entering the building while the loading dock door is open during loading or unloading of the truck. In other instances, however, it is highly undesirable for such a seal to be established between the truck and building. This occurs, for instance, during hot weather when the interior of a non-refrigerated truck will become unacceptably hot unless outside ventilation is provided.

Typical prior art sealing structures include those disclosed in the U.S. patents to Frommelt et al., U.S. Pat. Nos. 3,181,205, and 3,375,625, to Edkins et al., and German Pat. No. 2,930,295.

Laterally movable seals have been provided utilizing sliding door type tracks and hardware, but such tracks become filled with debris which make it difficult to move the seals, and the hardware binds so that the seals do not move freely.

Consequently, none of these prior art structures provide a convenient and practical means of selectively establishing or avoiding a seal between the rear of the truck and building, except by positioning the truck a distance away from the building, which typically is not acceptable because of the resulting gap between the rear of the truck bed and the floor of the loading dock or building.

SUMMARY OF THE INVENTION

The present invention provides a means of selectively sealing between the rear of a truck and a building and solves the problems presented by prior art seals by providing door seal structures which mount beside the building door and conveniently pivot from a position where contact between the seal and truck is established and one where a ventilation space is provided between the building and truck. Such pivoting movement may be provided by the double-acting hinge described in detail below or by any other structure which permits the desired movement of the seals.

Accordingly, it is an object of the present invention to provide a building door seal structure which can be utilized when sealing between a truck and the building is desired and which can be conveniently and easily repositioned when no such sealing is desired.

It is a further object of the present invention to provide a mechanism to permit a door seal to move between opened and closed positions which is sufficiently rigid and sturdy to withstand the rough handling such seals routinely receive.

An additional benefit of movable seals is reduction to wear of the seal bumper caused by truck contact, which wear does not occur when the seal is in its open position.

Other objects and benefits of the present invention will be apparent to one of ordinary skill in the art by reference to the following disclosure and the associated drawings.

DETAILED DESCRIPTION OF THE DRAWINGS

Figure 1:
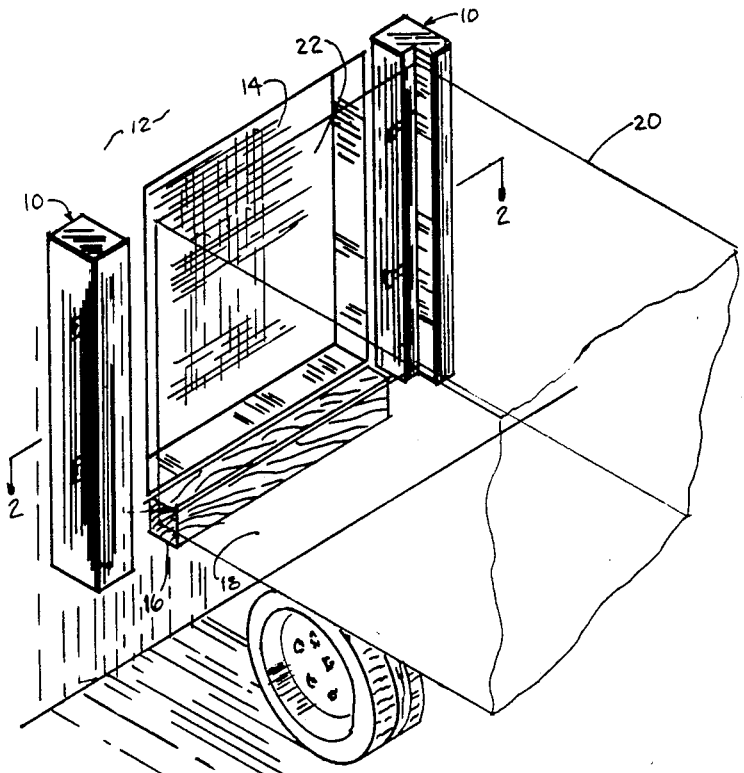
FIG. 1 is a perspective view of door seals of the present invention shown mounted adjacent to a building door, with the rear of a typical truck shown in phantom lines and with one seal shown in sealing position and the other shown positioned to permit ventilation.
Figure 2:
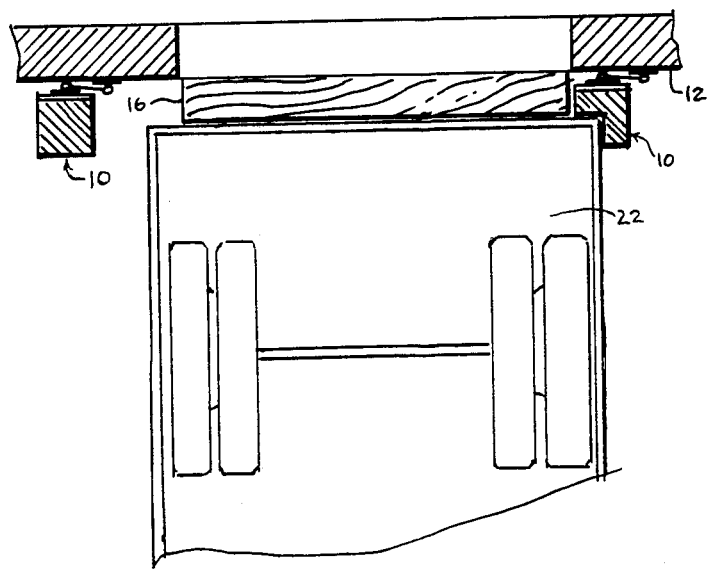
FIG. 2 is a plan view, in section, taken along a line 2—2 of FIG. 1.

FIGS. 1 and 2 illustrate a pair of seals 10 of the present invention mounted on an outer wall 12 of a building having a door opening 14 at the bottom margin of which is mounted a dock bumper 16 against which the rear of a bed 18 of a truck 20 is positioned. Seals 10 pivot laterally, and the left seal 10 is shown pivoted out of sealing engagement with the truck to permit ventilation, while the right seal 10 is shown in its sealing position. An additional sealing structure, not shown, may optionally be permanently or removably mounted adjacent to the upper margin of door opening 14 to provide sealing engagement with the rear of truck 20 roof 22. Such a structure may be substantially identical to the movable door seal of the present invention, particularly if the locking structure described below is utilized to permit the seal to be locked in an upper, "open" position.

Figure 3:
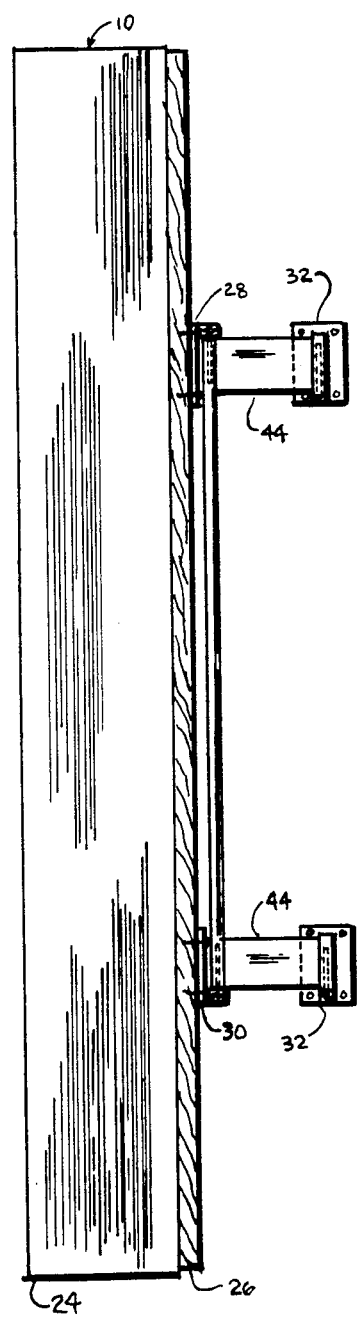
FIG. 3 is a side elevation view of one door seal of the present invention with the hinge structure shown extended and the bumper rotated 90° to make the hinge structure fully visible.

FIG. 3 illustrates the components of seal 10. Those include a resilient sealing bumper 24 which may be fabric-covered resilient polyurethane foam or any other suitable sealing structure, as will be appreciated by one skilled in the art, such as those disclosed in U.S. Pat. Nos. 3,375,625 and 3,181,205 mentioned above. Bumper 24 is affixed to a backing board 26 which may be wood, a metal plate or any other suitable structure on which bumper 24 may be mounted and to which hinge structures may be affixed as described below. Affixed to backing board 26 are upper and lower backing board pin structures, 28 and 30, respectively. Upper and lower pin structures 28 and 30 attached to backing board 26 are identical to the pin structures 32 which mount on building wall 12, except for the orientation of upper pin structure 28.

Figure 4:
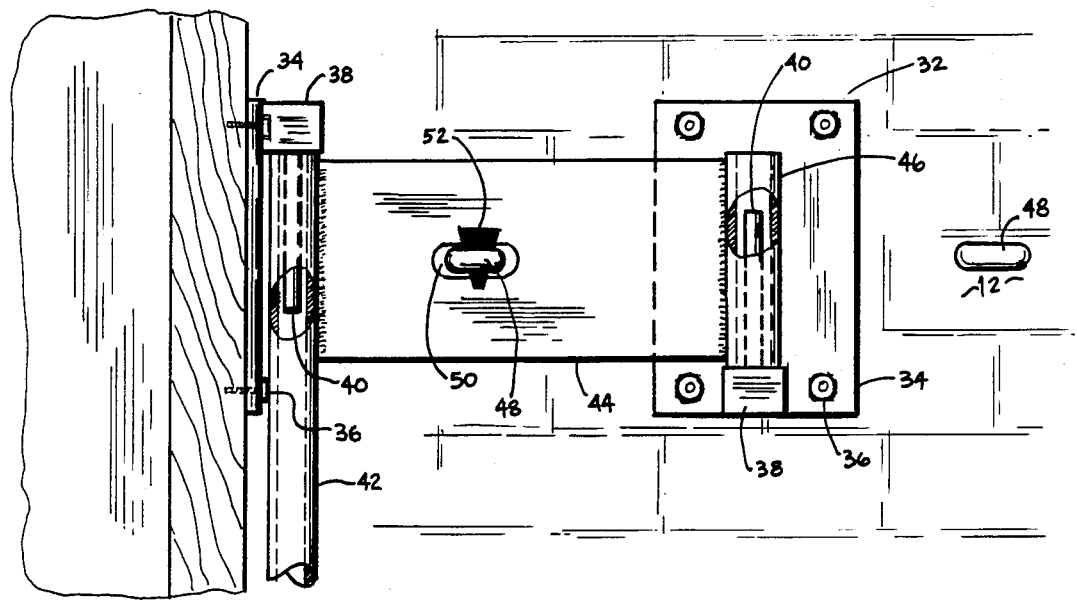
FIG. 4 is a detail of the door seal structure illustrated in FIG. 3 showing the upper hinge structure.
Figure 5:
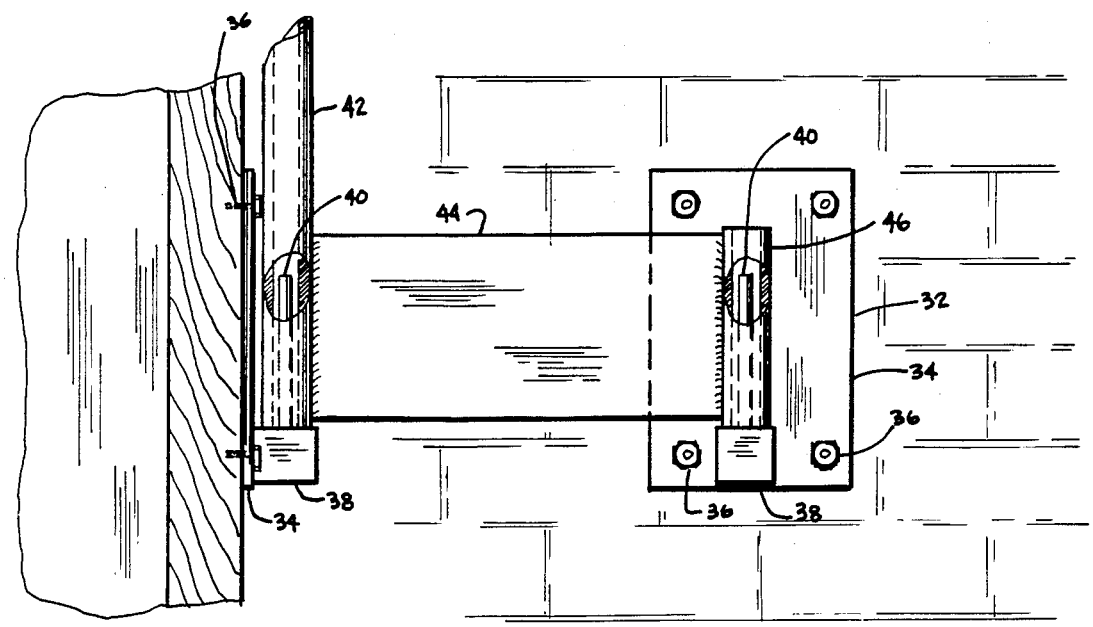
FIG. 5 is a detail of FIG. 3 showing the lower hinge structure.

All pin structures, which are well illustrated in FIGS. 4 and 5, comprise a plate 34 which is mounted with a suitable fastening means, such as screws or bolts 36, to backing board 26 or wall 12 as the case may be. A pin base 38 is rigidly mounted, as, for instance, by welding, to the plate 34, and a pin 40 extends from the pin base 38 so that pin 40 is parallel to but spaced apart from plate 34. Upper pin structure 28 is mounted on backing board 26 so that pin 40 extends down from pin base 38. The lower pin structure 30 and each of the pin structures 32 mounted on wall 12 are mounted so that pin 40 extends up from pin base 38.

A hollow tube 42, which may be a section of pipe substantially as long as the distance between the pin bases 38 in lower pin structure 28 and upper pin structure 30, is captured by the pins 40 of upper and lower pin structures 28 and 30 respectively. Webs 44 are mounted, as, for instance, by welding, to the upper and lower ends of tube 42 and extend from tube 42 at substantially a right angle. Webs 44 may be rectangular metal plates, rods, sections of tubing or pipe or any other suitable rigid members. Also welded or otherwise rigidly connected to webs 44 are tube sections 46 which may be sections of pipe. Tube sections 46 are positioned parallel to and suitably spaced apart from the major axis of tube 42 and engage pins 40 of wall-mounted pin structures 32. As will be readily appreciated by one skilled in the art, such a structure permits the bumper 24 mounted on backing board 26 to be pivoted between a first and second position on building wall 12, adjacent to the door opening 14 or spaced apart from it and simultaneously permits the bumper 24 and backing board 26 themselves to pivot so that backing board 26 can be arranged substantially flat against wall 12 in either position. This provides the desired sealing arrangement in one position and an attractive appearance and convenient, out-of-the-way storage in the non-sealing position.

As is illustrated in FIG. 4, a pair of staples 48 mounted on wall 12 may alternatively be received in an opening 50 in web 44 to provide a hasp structure so that seal 10 can be locked in either position by a peg 52 or other suitable locking means such as a padlock. Other similar means of locking the seal in a predetermined position will be readily apparent to one skilled in the art. For instance, studs or nuts may be mounted on plate 34 to pass through a hole in web 44 or receive a bolt passed through such a hole, respectively.

This disclosure is provided for purposes of illustration and explanation. Modifications may be made to the specific embodiments disclosed without departing from the scope and spirit of the invention.

I claim:

1. A movable door seal for attachment to a building adjacent to a truck loading dock door opening comprising a sealing bumper mounted on a backing board which is mounted on a double-acting hinge attached to the building adjacent to the opening to move the bumper and backing board laterally between a first position for sealing against a truck positioned at the door opening and a second nonsealing position.

2. The door seal of claim 1 wherein said hinge further comprises upper and lower pins mounted on the backing board, a first tube rotatably captured in the backing board pins, at least one pin for mounting on a building and for receiving a second tube connected to the first tube by a web.

3. The door seal of claim 2 further comprising a lock to secure the seal in a predetermined position.

4. A movable door seal comprising a sealing bumper, a backing board to which the bumper is affixed, a hinge for movably mounting the backing board on a building wall comprising a first pair of pins mounted on the backing board, a second pair of pins for mounting on a wall and a web for pivotably interconnecting the first pair of pins to the second pair of pins.

5. The door seal of claim 4 further comprising a lock to secure the seal in a predetermined position.

6. A movable door seal comprising a resilient bumper mounted on a backing board and a double-acting hinge for pivotably mounting the backing board and bumper on a building, which hinge comprises a first tube pivotably captured between a first pair of pins mounted on either the backing board or the building and a second and a third tube, each of which is connected to the first tube by a web and is pivotably mounted on one of a third and a fourth pin, both of which third and fourth pins are mounted on the other of the building or the backing board.

* * * * *